United States Patent [19]

Sievers

[11] Patent Number: 5,228,922
[45] Date of Patent: Jul. 20, 1993

[54] HIGH VOLTAGE ALKALI METAL THERMAL ELECTRIC CONVERSION DEVICE

[75] Inventor: Robert K. Sievers, Irwin, Pa.

[73] Assignee: Westinghouse Electric Corp., Pittsburgh, Pa.

[21] Appl. No.: 656,530

[22] Filed: Feb. 19, 1991

[51] Int. Cl.$^5$ .............................................. H01L 37/00
[52] U.S. Cl. ..................................... 136/202; 136/225; 136/234
[58] Field of Search ........................ 136/202, 225, 234

[56] References Cited

U.S. PATENT DOCUMENTS

| | | | |
|---|---|---|---|
| 3,672,443 | 6/1972 | Biewert et al. | 136/202 X |
| 4,808,240 | 3/1989 | Sievers | 136/202 |
| 5,039,351 | 8/1991 | Cooper et al. | 136/202 X |
| 5,066,337 | 11/1991 | Bhandari et al. | 136/202 X |
| 5,089,054 | 2/1992 | Sievers | 136/202 X |

OTHER PUBLICATIONS

Cole, T. (1983) "Thermoelectric Energy Conversion with Solid Electrolyes", *Science*, 221(4614):915.

Hunt, T. K., N. Weber and T. Cole, "Research on the Sodium Heat Engine" 13th Intersociety Energy Conversion Engineering Conference, SAE (1978) p. 2011.

Lasecki, J. V., R. P. Novak, J. P. McBridge, J. T. Brockway, and T. K. Hunt (1987) "A One Hundred Watt Sodium Heat Engine", in *22nd Intersociety Energy Conversin Engineering Conference*, AIAA, New York, N.Y., p. 1408.

Sievers, R. K., C. P. Banston, "Radioisotope Powered Alkali Metal Thermoelectric Converter Design for Space Systems", to be published in *23rd Intersociety Energy Conversion Engineering Conference*, Jul. 21, 1988, by ASME.

Sievers, R. K., R. A. Markley, J. E. Schmidt, N. Weber, J. R. Rasmussen, S. Olsen, and T. K. Hunt (1988) "Alkali Metal Thermoelectric Converter Design for Space power Systems Application" to be published in *Space Nuclear Power Systems* 1988; M. S. El-Genk and M. D. hoover, eds., Orbit Books Co., Malabar, Fla.

Koizumi, M., T. Okamoto, M. Shamida, K. Suganuma, "Diffusion-Reaction Bonding of Ceramics to Ceramics and Metal Under Pressure", *Am. Ceram. Soc. Bul.* V63, n. 9, Sep. 1984.

Canonico, D. A., G. M. Slaughter, M. C. Cole, "Direct Brazing of Ceramics, Graphite and Refractory Metals", *Welding Journal*, vol. 56, p. 31, 1977.

Suganuma, Okamoto, Koizumi and Shimaoa "Solid State Bonding of Oxide Ceramic to Steel" *The Institute of Scientific and Industrial Research*, Osaka University, Osaka Japan, 1985.

D. A. Canonico, N. C. Cole and G. M. Slaughter "Direct Brazing of Ceramics, Graphite and Refractory Metals" *Oak Ridge National Laboratory*, ERDA, Contract W-7405-ENG-26, Mar. 1976.

Primary Examiner—Peter A. Nelson
Attorney, Agent, or Firm—J. C. Valentine

[57] ABSTRACT

A high voltage multitube alkali metal thermal electric convertor having a plurality of closely packed tubular cells disposed in a tube sheet in a vessel and electrically connected in series, the tube sheet dividing the vessel into a high pressure high temperature portion having a wick and heater disposed therein and a low pressure low temperature portion having a wick disposed in a condenser from which heat is removed; a pump for transferring liquid metal therebetween and a tab on a wick disposed in the tubular cell to remove excess liquid metal and prevent shorting between the cells.

11 Claims, 3 Drawing Sheets

HIGH VOLTAGE ALKALI METAL THERMAL ELECTRIC CONVERSION DEVICE

BACKGROUND OF THE INVENTION

The invention relates to an alkali metal thermal electric conversion device and more particularly to one having a plurality of tubular cells electrically connected in series to produce a high voltage.

The vapor fed high voltage multitube alkali metal thermal electric converter is a high efficiency, static power conversion device for the direct conversion of thermal energy from a variety of sources to electrical energy. The basic cycle is described in U.S. Pat. No. 4,808,240 issued to the inventor. Beta alumina solid electrolyte base is an excellent sodium ion conductor, but a poor electron conductor. Electrons can therefore be made to pass almost exclusively through an external load. The electrical potential across the electrolyte is typically in the order of 0.5 volts at a current density of 1.0 amps per square centimeter. This type of system has promise for remote terrestrial and space applications because of its high efficiency and reliability due to no moving parts, and low mass.

SUMMARY OF THE INVENTION

Among the objects of the invention may be noted the provision of an alkali metal thermal electric converter wherein a plurality of cells can be electrically connected in series to produce high voltages and packaged to provide high efficiency.

In general, a high voltage alkali metal thermal electric converter, when made in accordance with this invention, comprises a plurality of tubular cells. Each tubular cell comprises a rigid porous tubular base portion, a wicking portion disposed on one of the major surfaces of the tubular base portion. The wicking portion has a tab, which extends downwardly below the tubular base portion. The cell also comprise a barrier, which is impervious to the alkali metal, is an electron insulator, is a conductor of alkali metal ions, and is disposed on the other major surface of the tubular base portion. A conductor grid over lays the barrier. A first electrical lead is electrically connected to the wicking portion and a second electrical lead is electrically connected to the conductor grid. The first electrical lead of one tubular module is electrically connected to the second electrical lead of an adjacent tubular module, electrically connecting the tubular modules in series. The thermal electric converter also comprises a vessel enclosing the modules therein. A tube sheet is disposed in the vessel for dividing the vessel into two portions, for receiving the tubular modules, for providing electrical isolation between all of the modules and for cooperating with the barrier to form a pressure/temperature barrier between the two portions, a high pressure high temperature portion and a lower pressure low temperature portion. Molten alkali metal is disposed in the high pressure high temperature portion of the vessel. The lower end of the tab of the wicking material is disposed above the alkali metal in the high pressure high temperature portion of the vessel allowing the individual modules to drain excess alkali metal into the same area of the vessel and remain electrically isolated. The converter further comprises means for heating the alkali metal in the high pressure high temperature portion of the vessel; means for condensing alkali metal vapor disposed in the low pressure low temperature portion of the vessel and means for pumping alkali metal form the low pressure low temperature portion of the vessel to the high pressure high temperature portion of the vessel for converting thermal energy into high voltage electrical energy.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

DESCRIPTION OF THE PREFERRED EMBODIMENT

Figure 1:
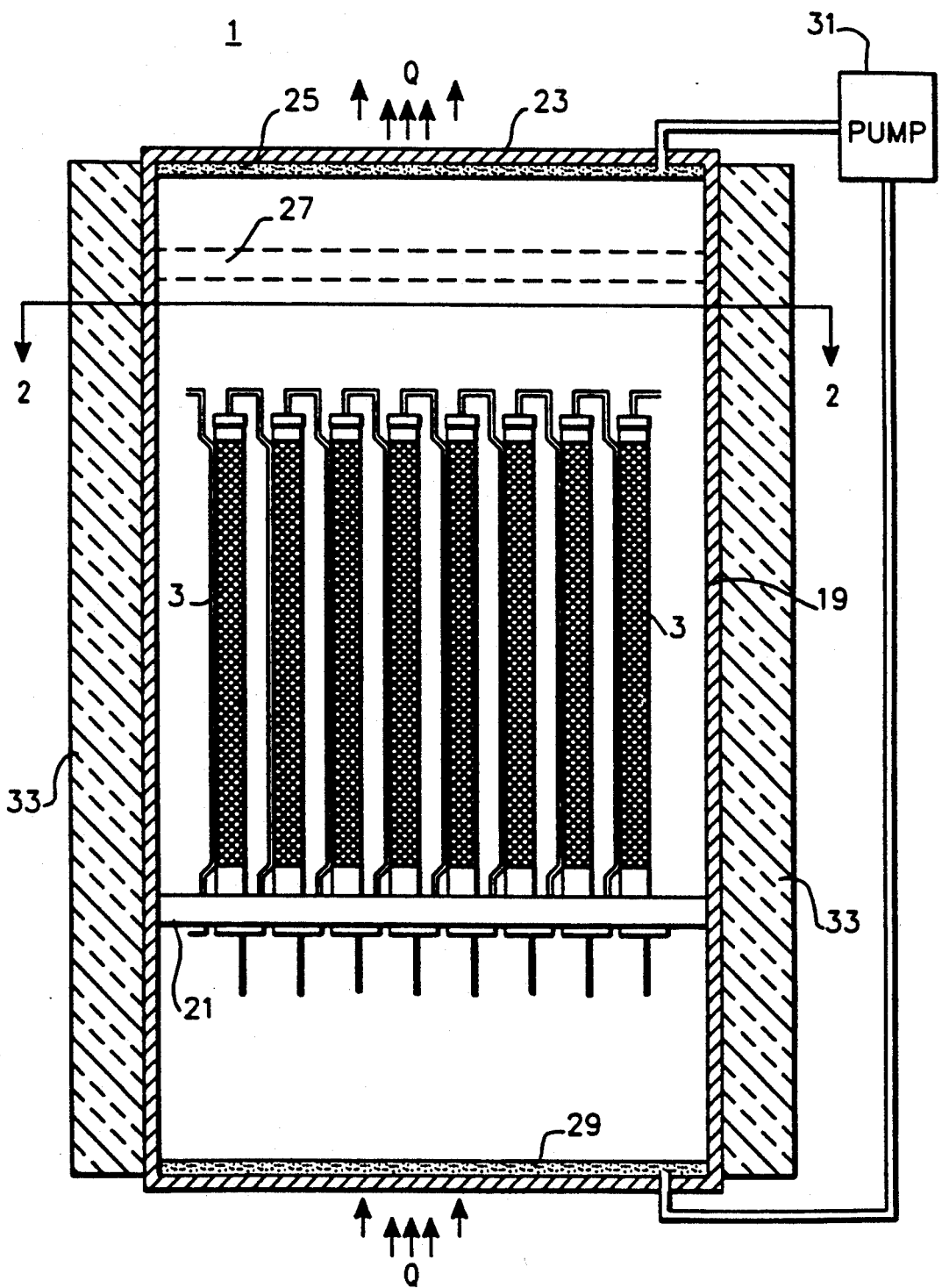
FIG. 1 is a schematic view of a high voltage alkali metal thermal electric converter.
Figure 2:
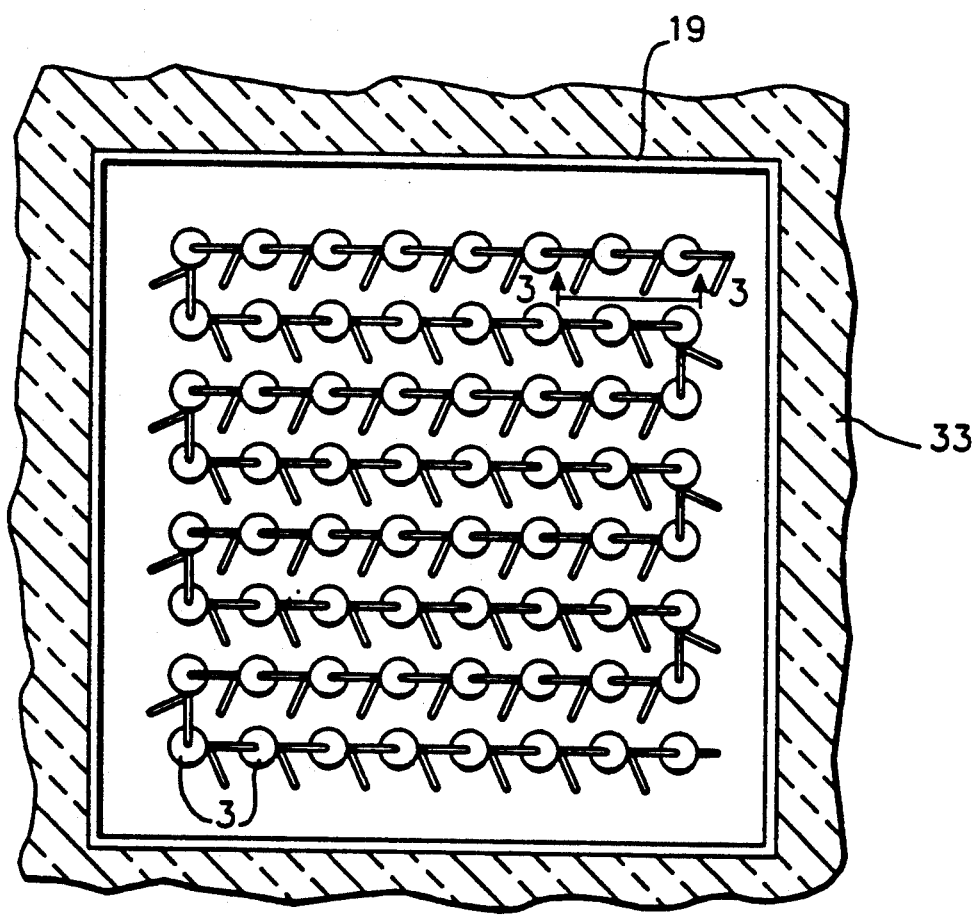
FIG. 2 is a sectional view taken on line A—A of FIG. 1.
Figure 3:
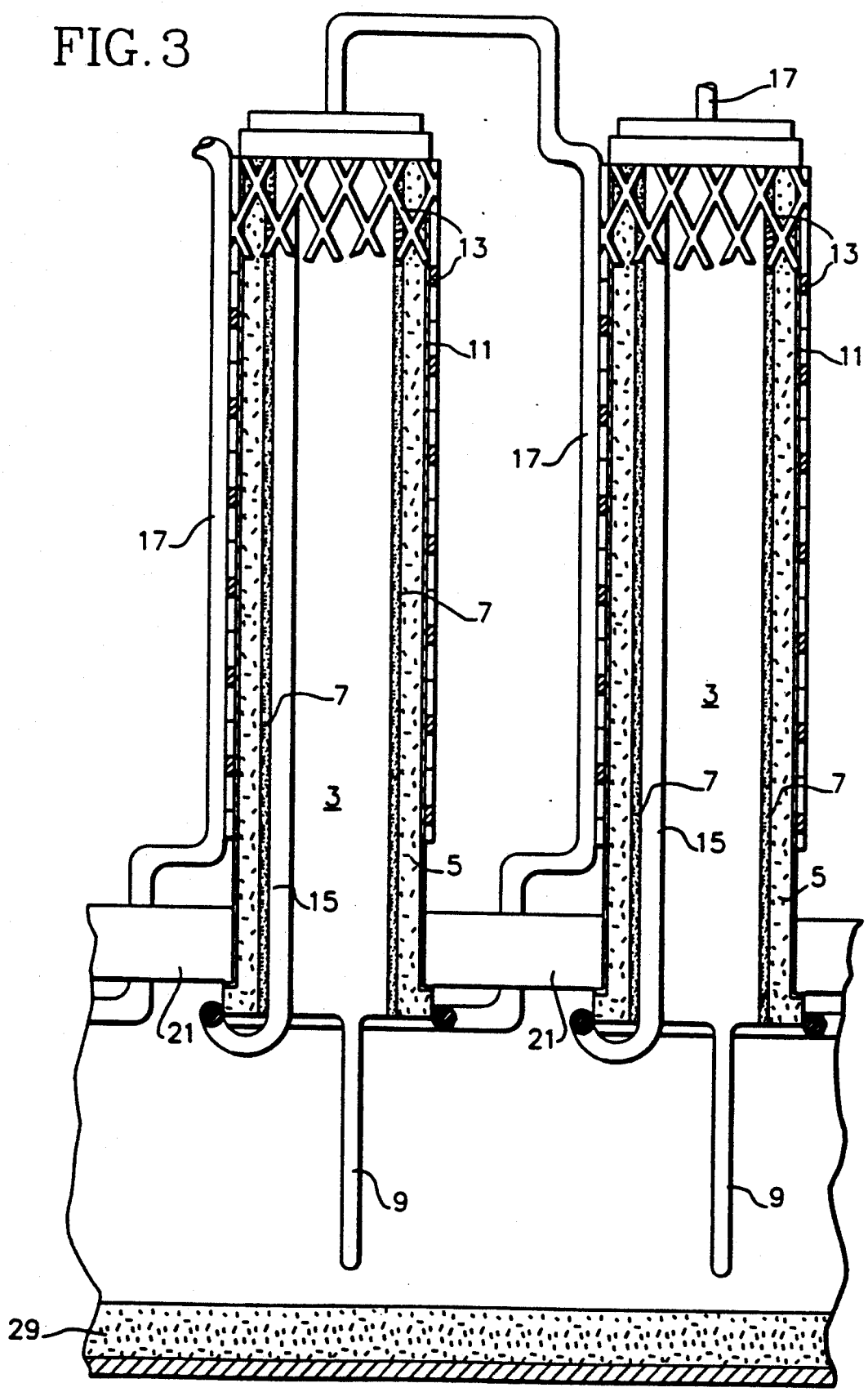
FIG. 3 is an enlarged sectional view taken on line B—B of FIG. 2.

Referring now to the drawings in detail and in particular to FIG. 1 through 3 there is shown a high voltage alkali metal thermal electric converter 1 comprising a plurality of tubular shaped alkali metal thermal electric cells 3. Each cell 3 comprises a rigid porous tubular shaped base or matrix 5 with a wicking portion 7 disposed on one of the major surfaces, preferably the inner surface. The wicking portion 7 has a tab 9 which extends beyond the base portion to drain excess liquid alkali metal, sodium, from the wicking portion 7 to prevent droplets of alkali metal from producing a short circuit between adjacent cells. A thin film electrolyte or barrier 11 of beta alumina overlays the other major surface, the outer surface, of the tubular base 5. The beta alumina barrier 11 is generally impervious to the liquid alkali metal, is a very pour conductor of electrons and thus considered an electrical insulator, but the beta alumina is a good conductor of alkali metal ions. A conductive grid 13 is disposed over the beta alumina barrier 11. A first conductor or electrical lead 15 is electrically connected to the wicking portion 7 and a second conductor or electrical lead 17 is electrically connected to the conductive grid 13. The first electrical lead 15 of one cell 3 is electrically connected to the second electrical lead 17 of an adjacent cell connecting the cells in series. Both ends of the second lead 17 are electrically connected to the second lead 17 of the adjacent cell keeping the resistance therebetween to a minimum.

The cells 3 are enclosed in a vessel 19 having a tube sheet 21 disposed therein for receiving the cells 3 in the upper portion thereof, for providing electrical isolation of the cells and for cooperating with the beta alumina barrier to divide the vessel 19 into a high pressure, high temperature portion and low pressure, low temperature portion. In the upper low pressure, low temperature portion of the vessel 19 is a condenser 23 having a wick 25 or other means for collecting condensed alkali metal vapor. Between the condenser 23 and the cells 3 is a radiation and drip shield 27 for preventing heat radiating from the cells 3 to the condenser 25 and liquid alkali metal droplets from the condenser wick 23 from dripping onto the cells and thereby helping to provide a highly efficient thermal electric converter 1.

The tube sheet 21 is preferably made of an insulating ceramic material to electrically isolate the cells 3, however it is understood that the tube sheet need not be an insulator, if insulating thimbles (not shown) were utilized to electrically isolate each cell 3 and the second electrical leads 17.

The lower portion of the vessel 19 also has a wick 29 disposed on the bottom portion for distributing the liquid alkali metal across the area where heat energy is added. A magnetic or other means 31 for pumping the alkali liquid metal transfers or pumps the liquid metal form the wick 25 in condenser 23 to the wick 29 in the bottom of the high pressure portion of the vessel 19 forming a closed system.

The vessel 19 is thermally insulated by insulation 33 and heat energy is added to the bottom portion of the vessel 19 by any appropriate heating means and heat energy is removed via the condenser 23 disposed on the top portion of the vessel 19.

The operation of the high voltage alkali metal thermal electric converter 1 is initiated by adding heat energy to the alkali metal, sodium, in the bottom of the vessel 19 causing it to vaporize, the high pressure vapor flows to the slightly cooler region inside the cells 3, wherein the vapor condenses on the wicking portion 7 of the cell 3 and the liquid sodium is wicked to the porous base portion 5. About 25% of the liquid sodium enters the conversion process passing through the base portion 5. The remaining portion wicks through the wicking portion 7 and base 5 and is returned by gravity to the downward extension of the tab portion 9 creating a slight pressure differential to prevent liquid sodium from forming droplets on the bottom of the base portion 5 of the cell 3 where there is a potential of causing a short between cells 3.

The electrolyte or barrier 11 forms a boundary between high and low pressure sodium filled regions. The temperature in the region of the electrolyte 11 is elevated so that the corresponding saturation pressure is greater than the low pressure region. Under these conditions a chemical potential is developed across the electrolyte 11 that drives sodium ions from the high to the low pressure side along ion conduction planes in the crystal lattice. A charge or electrical potential difference is thereby developed across the electrolyte 11 by the positive ions emerging on the low pressure side and excess electrons, released when the neutral sodium ionized, accumulating on the high pressure side. Electron conduction layers, that allow the passage of sodium to the surface of the electrolyte 11, are located on both sides of the electrolyte 11. These conduction layers are connected through an adjacent cell 3 or a load and allow the excess electrons accumulating on the high pressure side to move to the low pressure side where they recombine with the excess sodium ions, and in the process perform electrical work on the load. The sodium ions that have passed through the electrolyte 11 and are recombined with an electron on the low pressure side, evaporate from the electrolyte surface 11 leaving the outer base tube surface 5 on the low pressure side moves to the top plate where they are condensed. The wick 25 in the condenser 23 retains the condensate and moves it toward the liquid metal pump 31. The liquid metal is then returned by the pump 31 to the wick 29 on the bottom of the high pressure high temperature portion of the vessel 19. The radiation and drip shield 27 catches any drops that might fall from the wick 25 in the condenser 25 preventing damage to the base tube 5 due to thermal shock. Radiation heat losses are minimized by the combination of the polished heat shield 27 and the insulated side walls of the vessel 19. The low radiation heat loss combined with low current density advantageously delivers peak efficiency an higher voltages, allowing smaller current collector leads and result in less differential thermal expansion stresses being imposed on the base units 5 by the leads 15 and 17.

Ohmic heating in the portions of the leads 15 which ring the high pressure end of the base tube 5 provide sufficient heat to this portion of the base tube 5 to prevent liquid formation which could short circuit the cells 3.

The alkali metal thermal electric conversion device 1 described herein advantageously allows a large number of base tubes 5 to be electrically connected in series and still utilize a common heat source and condenser 23, reduces parasitic heat losses which reduce efficiency, reduced possibility of short circuits because of the ohmic heating in the current and the resulting freedom from liquid sodium and the freedom from drips of liquid sodium as a result of the removal by the wick extensions 9.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

What is claimed is:

1. A high voltage multitube alkali metal thermal electric convertor comprising a plurality of tubular cells, each tubular cell comprising a rigid porous tubular base portion, a wicking portion disposed on one of the major surfaces of the base portion, the wicking portion having a tab, which extends downwardly below the base portion, a barrier, which is impervious to the alkali metal, is an electron insulator, is a conductor of alkali metal ions, and is disposed on the other major surface of the tubular base portion, a conductor grid over laying the barrier, a first electrical lead electrically connected to the wicking portion and a second electrical lead electrically connected to the conductor grid, the first electrical lead of one tubular cell being electrically connected to the second electrical lead of an adjacent tubular electrically connecting the tubular cells in series; a vessel enclosing the cells therein a tube sheet disposed in the vessel for dividing the vessel into two portions, receiving the tubular cells, providing electrical isolation between all of the cells and cooperating with the barrier to form a pressure barrier between the two portion, a high pressure high temperature portion and a lower pressure low temperature portion; molten alkali metal disposed in the high pressure high temperature portion of the vessel, the lower end of the tab of the wicking material being disposed above the alkali metal in the high pressure high temperature portion of the vessel allowing the individual cells to drain excess alkali metal into the bottom of the vessel and remain electrically isolated; means for heating the alkali metal in the high pressure high temperature portion of the vessel; means for condensing alkali metal vapor disposed in the low pressure low temperature portion of the vessel and means for pumping alkali metal form the low pressure low temperature portion of the vessel to the high pressure high temperature portion of the vessel for converting thermal energy into high voltage electrical energy.

2. The thermal electric converter of claim 1, wherein the wicking portion is disposed on the inner surface of the tubular base and the barrier is disposed on the outer surface of the tubular base.

3. The thermal electric converter of claim 1, wherein the upper portion of the vessel is the low pressure low temperature portion and the lower portion of the vessel is the high pressure high temperature portion of the vessel.

4. The thermal electric converter of claim 1 further comprising a radiation shield disposed between the tubular cells and the condensing means for preventing radiant heat energy from the tubular cells irradiating the condensing means.

5. The thermal electric converter of claim 4, wherein the radiation shield is also a drip shield preventing alkali metal droplets formed on the condenser from dripping on the tubular cells.

6. The thermal electric converter of claim 1, wherein the condensing means comprises a wicking means for collecting condensed alkali metal vapor.

7. The thermal electric converter of claim 1, and further comprising wicking means disposed on the bottom of the vessel for distributing the molten alkali metal across the bottom of the vessel.

8. The thermal electric converter of claim 1 and further comprising means for heating the alkali metal in the bottom of the vessel.

9. The thermal electric converter of claim 1, wherein the second conductor has both of its ends electrically connected to an adjacent first conductor.

10. The thermal electric converter of claim 1, wherein the vessel is insulated to conserve energy and improve the efficiency of the thermal electric converter.

11. The thermal electric converter of claim 1, wherein one of the electrical leads rings the high pressure end of the base tube to provide ohmic heating to prevent the formation of alkali liquid metal adjacent thereto which could form a short between cells.

* * * * *